Dec. 7, 1926.

T. L. FAWICK

FRICTION CLUTCH

Filed Sept. 2, 1920

1,609,467

2 Sheets-Sheet 1

Witness
Martin H. Olsen.

Inventor
Thomas L. Fawick

Dec. 7, 1926.  1,609,467
T. L. FAWICK
FRICTION CLUTCH
Filed Sept. 2, 1920   2 Sheets-Sheet 2

Patented Dec. 7, 1926.

1,609,467

UNITED STATES PATENT OFFICE.

THOMAS L. FAWICK, OF RACINE, WISCONSIN, ASSIGNOR TO TWIN DISC CLUTCH COMPANY, OF RACINE, WISCONSIN, A CORPORATION OF WISCONSIN.

FRICTION CLUTCH.

Application filed September 2, 1920. Serial No. 407,772.

My invention relates to that form of friction clutch in which a disk on one of two concentric rotary members, such as a pair of shafts or a shaft and flywheel, is arranged between a pair of relatively axially movable elements secured to the other of said rotary members with provision for forcing the latter elements towards each other when the rotary members are to move together. The object of the invention is to provide such a clutch of simplified construction which will be easy to manufacture and efficient and reliable in operation.

Figures 1, 4:
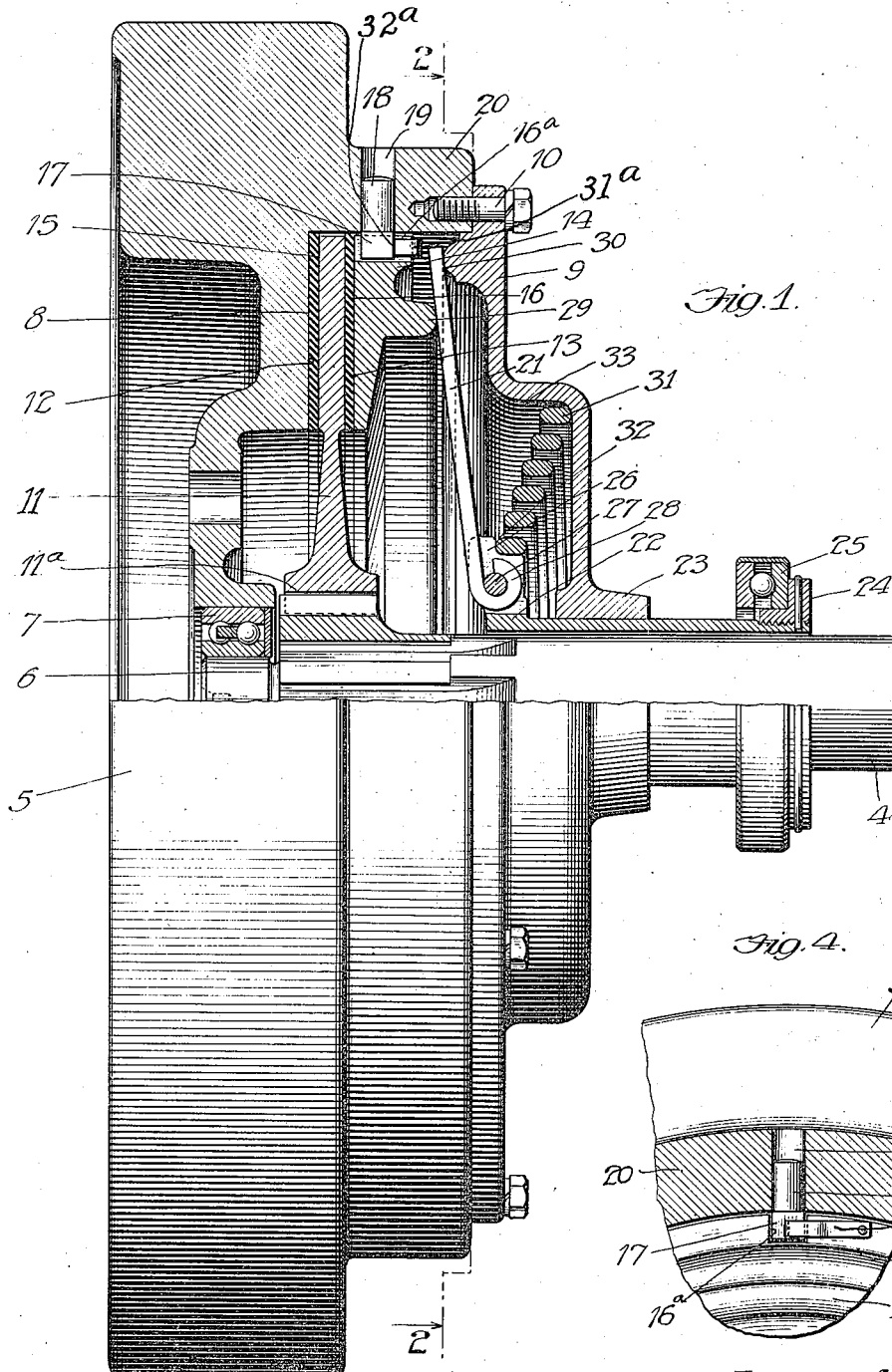
Figure 2:
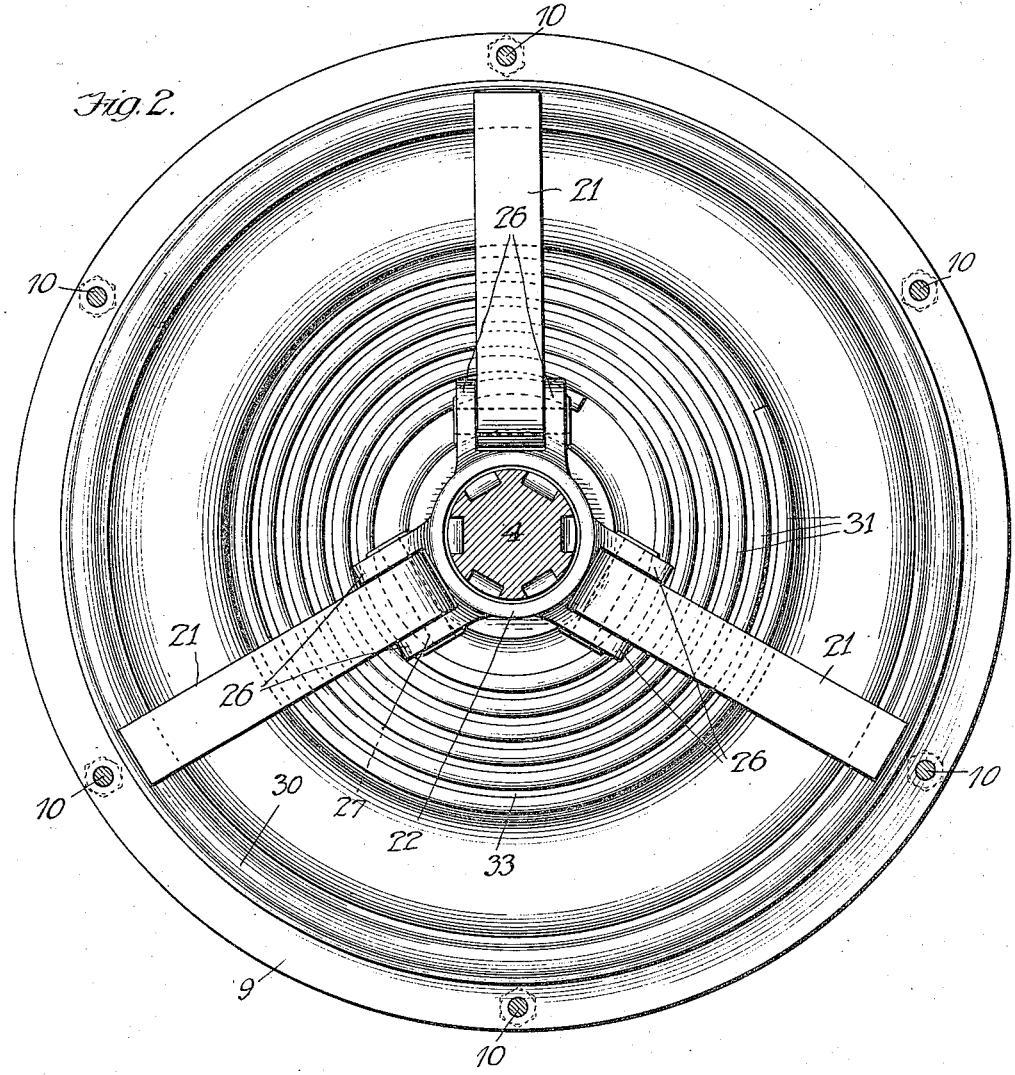
Figure 3:
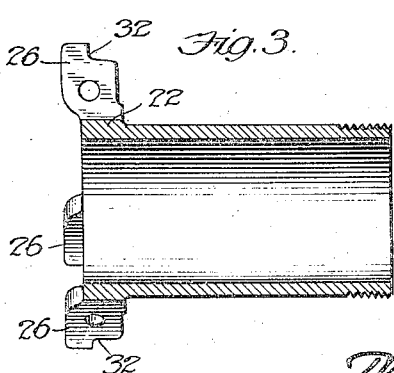

In the accompanying drawings Fig. 1 is a side elevation partly in section on an axial plane showing a clutch embodying my improvement; Fig. 2 a transverse section thereof on the line 2—2 of Fig. 1; Fig. 3 an axial section of a detail; and Fig. 4 is a transverse section showing a detail.

In the drawings I have shown the clutch as applied for the purpose of establishing and disestablishing connection between a shaft 4 and a flywheel 5, the latter being mounted as commonly on a reduced end 6 of the shaft 4, a roller bearing 7 being interposed between said shaft and flywheel. The flywheel is recessed or countersunk as at 8 to form with a cover 9 therefor a chamber which receives the operating parts of the clutch. The cover is shown bolted to the flywheel at 10. Within the recess or chamber friction disk 11 is splined at 11ᵃ to the shaft so as to have a slight axial movement relative thereto, and is received between the annular plane shoulder 12 formed in the bottom of the chamber of the flywheel and the annular plane face 13 of the axially movable pressure element or ring 14. The face of the shoulder and the face of the axially movable pressure ring are provided with annular disks 15, 16 of suitable friction material such as is well known in this art. The pressure ring is circular on its outer periphery except for one or more grooves or recesses 16ᵃ which receive the flattened ends 17 of pins 18 which preferably have a driving fit within radial bores 19 in the flange 20 of the flywheel, said pins and grooves being for the purpose of carrying the pressure ring with the flywheel and permitting relative axial movement between the two.

In order to provide for clamping the friction disk 11 between the shoulder of the flywheel and the pressure ring I provide a series of levers 21 which may be three in number as shown and said levers, which are radially arranged, are connected at their inner ends to an axially movable sleeve 22 which extends through a hollow hub 23 on the cover 9 and is provided outside the latter with a collar 24 which receives a ball bearing 25. The latter is adapted to be embraced or engaged by any suitable or usual fork for drawing the sleeve outward against the pressure of the spring, to be presently described, when the clutch is to be released. The levers are pivoted at their inner ends between pairs of lugs 26 formed upon and suitably spaced about the inner end of the sleeve 22, pins 27 extending between the lugs of each pair to form journals or bearings for the inner ends of the levers 21 which are bent to form eyes 28 to receive said pins. The levers extend loosely between and bear upon the pressure ring and cover which are formed respectively with annular ribs 29, 30, said ribs being concentric and spaced from each other a sufficient distance to secure the required leverage, the crowns of said ribs being arched or rounded in cross-section as best seen in Fig. 1 to provide fulcra or bearings for the levers. A helical spring 31 is compressed between the lugs 26, which are shouldered at 32 to receive the same, and the inner surface of the cover 9 which is formed with a recess or chamber 33 to receive said spring.

The levers 21 are formed of steel and of such dimensions and resilient material that if, due to irregularity in manufacture, wear or the like, one of the levers receives more pressure than the others it yields sufficiently to distribute the stress so that each of the levers exerts approximately the same compression upon the pressure ring as the others, so that said ring is uniformly and evenly forced inward when the spring 31 is permitted to act. Because of the annular character of the seats or fulcra formed by the ribs 29, 30 no care is necessary in angularly adjusting the levers in assembling the clutch as would be the case where the levers are provided with separate individual seats, and it is only necessary after the flywheel, friction disk and pressure ring are assembled to put the sleeve carrying the levers on the shaft, permitting the levers to fall where they may on the fulcrum rib of the compressor ring and then secure the cover in position with the spring clamped between the same and the lugs on the sleeve. The levers are unattached except for their pivotal connection to the sleeve thus dispensing with the usual journals which require careful fitting in assembling and are apt to become worn and require replacement. The sleeve may be left free for angular movement relative to the shaft so that the points of bearing of the levers on the fulcrum ribs may shift from time to time.

Small springs 31$^a$ secured to the member 29 are inwardly bent at their ends 32$^a$ and bear upon the keys 17 to slightly move the member 29 away from the friction disc when the former is released.

I claim:

1. A clutch comprising a pair of coaxial relatively rotatable members, a friction disk on one of said members, relatively axially movable, clamping members on opposite sides of said disk secured for rotation to the other rotatable member, continuous annular flanges on the respective clamping members forming fulcra, an axially movable sleeve, levers of uniform width loosely engaging said fulcra near the outer ends of said levers, and means for pivoting said levers to said sleeve at the inner ends of said levers to prevent displacement of said levers.

2. In a device of the class described, a rotary member, a friction disk splined thereon, a second rotary member, a pair of clamping elements rotatable with said second member and arranged on opposite sides of said friction disk, continuous annular concentric fulcrum ribs formed on the respective clamping elements, an axially movable sleeve, a plurality of levers of uniform width loosely engaging said ribs near the outer ends of said levers, means for pivoting said levers at their inner ends to said sleeve to prevent displacement thereof, a spring for forcing the sleeve in one direction and means for forcing the sleeve in the opposite direction.

3. In a device of the class described, a rotary member having a friction disk splined thereon, a second rotary member, clamping elements secured for rotation with said second rotary member but having relative axial movement, an axially movable sleeve and a series of straight fulcrumed resilient levers pivotally connected to said sleeve and engaging said clamping elements.

4. In a device of the class described, a shaft, a friction disk splined thereon, a rotary element having an annular friction surface thereon to engage the disk, a pressure ring arranged upon the opposite side of said disk from said rotary element and secured to the latter for rotation therewith, continuous annular concentric ribs suitably spaced from each other on the rotary element and pressure ring, an axially movable sleeve on the shaft, resilient levers extending loosely between said ribs near their outer ends, means for pivoting said levers to said sleeve at the inner ends of the levers to prevent displacement of the latter, a spring engaging said sleeve for forcing the levers in one direction and means for forcing the levers in the other direction.

5. In a device of the class described, a rotary member, a friction disk splined thereon, a second rotary member, clamping elements secured for rotation with said second rotary member but having relative axial movement, a series of levers of uniform cross-section throughout engaging said clamping members and having rolled eyes, and an operating device to which said levers are pivoted by said eyes.

6. In a device of the class described, a rotary member, a friction disk splined thereon, a second rotary member, clamping elements secured for rotation with said second rotary member but having relative axial movement, an annular flange on each clamping element, the flanges being of different diameters, a sleeve, and a series of resilient levers of uniform thickness pivoted to said sleeve and engaging said flanges.

7. In a device of the class described, a sleeve provided with ears, levers pivoted at one end between said ears, and an operating spring having its inner coil seated on said ears and surrounding the pivoted ends of said levers.

THOMAS L. FAWICK.